United States Patent
Randazzo et al.

(10) Patent No.: US 7,437,223 B2
(45) Date of Patent: Oct. 14, 2008

(54) HEADING REFERENCE COMMAND AND CONTROL ALGORITHM AND CUEING SYSTEMS AND METHODS FOR AIRCRAFT TURN-TO-TARGET MANEUVERS

(75) Inventors: Pasquale A. Randazzo, Havertown, PA (US); John D. Butkiewicz, Gilbert, AZ (US); David G. Miller, Mr. Laurel, NJ (US); David C. Mossman, Gilbert, AZ (US); Paul Redkoles, Mantua, NJ (US); Channing S. Morse, San Diego, CA (US)

(73) Assignee: The Boeing Company, Chicago, IL (US)

( * ) Notice: Subject to any disclaimer, the term of this patent is extended or adjusted under 35 U.S.C. 154(b) by 431 days.

(21) Appl. No.: 11/198,630

(22) Filed: Aug. 5, 2005

(65) Prior Publication Data
US 2007/0030174 A1 Feb. 8, 2007

(51) Int. Cl.
*G01C 21/00* (2006.01)
(52) U.S. Cl. .......................... 701/4; 340/974
(58) Field of Classification Search ................ None
See application file for complete search history.

(56) References Cited

U.S. PATENT DOCUMENTS

| 5,072,218 | A | * | 12/1991 | Spero et al. ............... 340/980 |
| 5,296,854 | A | * | 3/1994 | Hamilton et al. ........... 340/980 |
| 5,649,061 | A | * | 7/1997 | Smyth ...................... 706/16 |
| 7,091,881 | B2 | * | 8/2006 | Judge et al. ............... 340/979 |
| 7,106,217 | B2 | * | 9/2006 | Judge et al. ............... 340/973 |
| 2003/0127557 | A1 | * | 7/2003 | Anderson et al. .......... 244/1 R |

OTHER PUBLICATIONS

Zintsmaster, L.R.; Wide-Eye Helmet Mounted Display System for Rotorcraft Applications; IEEE AES Systems Magazine, Mar. 1994; pp. 6-10.*
David G. Miller et al., *HACT Flight Control System (HFCS) Control Law Overview*, American Helicopter Society 58th Annual Forum, Jun. 11-13, 2002, 18 pages, American Helicopter Society, Inc.

* cited by examiner

*Primary Examiner*—Michael J. Zanelli
(74) *Attorney, Agent, or Firm*—Wildman, Harrold, Allen & Dixon, LLP

(57) ABSTRACT

Systems and methods are provided for determining a final heading of a turning vehicle, such as a rotorcraft. The system may include an algorithm that calculates an advance prediction of a final heading that will be achieved after control input is terminated. The system may also include a device, such as a display, for conveying predicted final heading information to an aircraft controller, such as a pilot.

20 Claims, 9 Drawing Sheets

US 7,437,223 B2

HEADING REFERENCE COMMAND AND CONTROL ALGORITHM AND CUEING SYSTEMS AND METHODS FOR AIRCRAFT TURN-TO-TARGET MANEUVERS

This invention was made with Government support under contract number DAAH10-00-C-0052 awarded by the United States Army. The Government has certain rights in this invention.

BACKGROUND OF THE INVENTION

1. Field of the Invention

The invention is related to vehicle control, and more specifically, to systems and methods for precisely and quickly pointing a vehicle in a desired direction.

2. Description of the Related Art

Turning a machine, such as a vehicle, or a portion thereof, quickly to point in a desired direction can be difficult. Turning precisely and quickly can be a challenge for flying and/or hovering vehicles, such as, for example, a helicopter or other rotorcraft (e.g., a tilt-rotor aircraft, a vertical/short takeoff and landing (VSTOL) aircraft), whether it is piloted or an unmanned aerial vehicle (UAV). Typically, internal and external effects, such as moments of inertia, angular momentum, structural limits, aerodynamic loads, and control surface actuator authority and rate limits must be dealt with.

For military aircraft, it may be especially important to have a capability to point a vehicle quickly in a desired direction, for example, to acquire, track, and fire upon an enemy target in advance of the enemy firing upon the aircraft. In this regard, the United States Army has established a performance specification entitled "AERONAUTICAL DESIGN STANDARD (ADS-33E-PRF) HANDLING QUALITIES REQUIREMENTS FOR MILITARY ROTORCRAFT," that includes the following requirement for flight in Good Visual Environment (GVE) conditions:

"3.11.17 Turn to Target (Handling Qualities Requirement).

From a stable hover at an altitude of less than 20 ft complete a 180 deg turn. Turns must be completed in both directions. Final rotorcraft heading must be achieved within 5 seconds of initiating the turn within +/−3 degrees of the target."

This task may be difficult with state-of-the-art technology because it is typically difficult for a pilot to time his or her directional control inputs precisely enough to get the aircraft to stop at the intended terminal heading without significant heading overshoot and time consuming heading backup toward the target heading. The heading overshoot and resulting heading backup problems are a result of aircraft yaw acceleration and jerk (time derivative of acceleration) limitations that prevent the pilot from instantaneously arresting the yaw rate developed during the turn.

In single rotor helicopters, these yaw acceleration and jerk limitations are imposed by the combined effect of tail rotor gearbox torque limits, tailrotor collective pitch actuator authority and rate limits, and limitations on allowable yaw acceleration due to inertial structural load limitations on attachment points for external stores.

Tandem rotor helicopters and tiltrotor aircraft face similar limits on allowable yaw acceleration and jerk due to rotor flapping induced blade and hub loads and differential cyclic pitch actuator authority and rate limits. Thus, the rapid turn to target task is difficult in virtually all vehicles with Vertical Takeoff Or Landing (VTOL) capabilities.

Meeting this requirement with existing rotorcraft control systems and configurations would rely heavily on pilot skill and training. For example, a pilot would need to anticipate, while turning a rotorcraft, the heading (azimuth) that the rotorcraft would achieve at the end of the turn once input force is released from the controls (e.g., rudder pedals), largely relying on experience and "feel" of the rotorcraft's handling characteristics, as well as mentally factoring in environmental conditions such as wind, altitude, etc. This results in an undesirably high pilot workload, and meeting the requirement using existing rotorcraft control systems and configurations could be impossible, or very difficult. In addition, there is a possibility of a pilot inadvertently exceeding the mechanical limits of a rotorcraft tail rotor gearbox and/or airframe while attempting to turn to a target quickly.

One possible solution is to build a rotorcraft with a large tail rotor, such as proposed to be included in the Comanche helicopter program. However, such a solution may require an excessive cost, as well as design tradeoffs, such as increased weight and reduced agility.

This disclosure is directed toward overcoming one or more problems or disadvantages associated with the prior art.

SUMMARY OF THE INVENTION

According to one aspect of the invention, a computerized system is provided for cueing a pilot of a maneuvering aircraft to a closest possible aircraft attitude where an angular rate of the maneuvering aircraft can be arrested at a final aircraft attitude with essentially no attitude overshoot the system may include a processor, programmed to calculate, during a maneuver, a predicted final aircraft attitude based on aircraft parameters, and a visual cue referenced to an image of the outside world.

According to another aspect of the invention, the visual cue may be generated by information provided by the processor, corresponding to the predicted final aircraft attitude. The image of the outside world may be a virtual image, and/or may be provided by a synthetic vision system. The angular rate may include a yaw rate. The visual cue may be a diamond shaped cue with cross hairs, may be referenced to and superimposed over head-tracked FLIR imagery, may be provided in a monocle lens, and/or may be adapted to move horizontally and vertically with respect to head-tracked FLIR imagery to simultaneously indicate a closest possible heading where the aircraft yaw rate can be stopped with no heading overshoot and a closest possible aircraft pitch attitude where the aircraft pitch rate can be arrested with no pitch attitude overshoot. The visual cue may use head-up flight display symbology or, alternatively, may use head-down flight display symbology. The visual cue may use a diamond shaped cue superimposed on a heading tape indicator of a flight display.

According to still another aspect of the invention, a system for providing enhanced control authority in a rotorcraft includes a processor, and an output device operatively connected to the processor. The processor may be programmed to calculate, during a maneuver, a predicted final rotorcraft attitude based on rotorcraft parameters, the rotorcraft parameters including a maximum angular rate, a maximum angular acceleration, and a maximum angular jerk, and the output device may be capable of conveying the predicted final rotorcraft attitude to a rotorcraft controller. The output device may include a visual display of a heading prediction cue.

According to yet another aspect of the invention, a system for providing enhanced yaw control authority in a rotorcraft includes a processor having a memory, programmed to calculate, during a turning maneuver, a predicted rotorcraft azimuth angle based on rotorcraft turning parameters, the rotorcraft parameters including a maximum yaw rate, a maximum yaw acceleration, and a maximum yaw jerk. The system also includes an output device operatively connected to the processor, and capable of conveying the predicted rotorcraft azimuth to a rotorcraft controller. The output device may include a visual display of a heading prediction cue.

In accordance with still another aspect of the invention, a method of providing enhanced control authority in a rotorcraft includes calculating, during a maneuver, a predicted final rotorcraft attitude based on rotorcraft parameters, the rotorcraft parameters including a maximum angular rate, a maximum angular acceleration, and a maximum angular jerk, and conveying the predicted final rotorcraft attitude to a rotorcraft controller. The method may include providing a visual display of a heading prediction cue.

In accordance with yet another aspect of the invention, a method of cueing a pilot of a maneuvering aircraft is provided. The method includes calculating, during a maneuver, a predicted final aircraft attitude based on aircraft parameters, and providing a visual cue corresponding to the predicted final aircraft attitude.

The features, functions, and advantages can be achieved independently in various embodiments of the present invention or may be combined in yet other embodiments.

DETAILED DESCRIPTION

Figure 1:
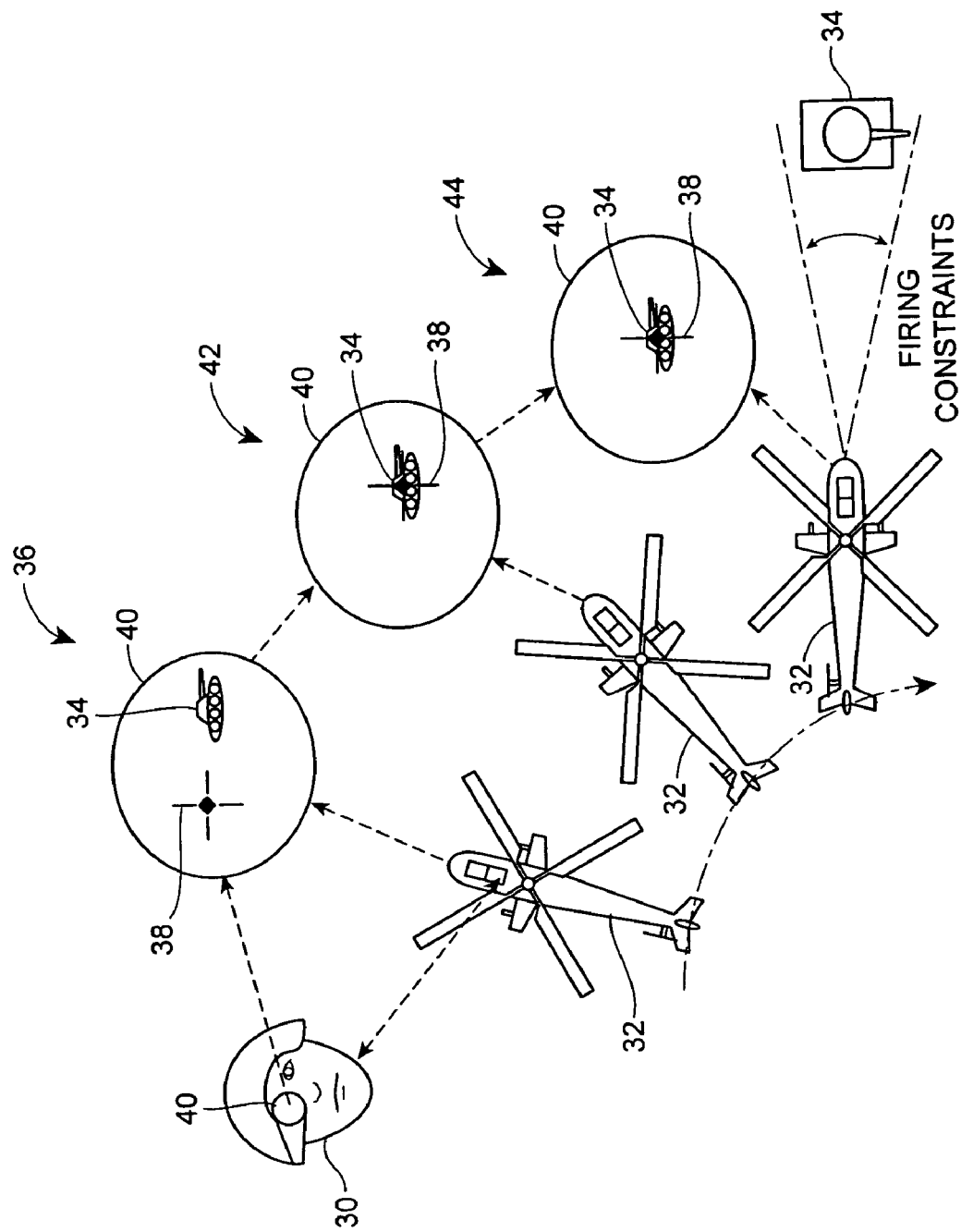
FIG. 1 is diagrammatic plan view of a rotorcraft that may incorporate the invention, shown in three phases of an exemplary turning maneuver.

FIG. 1 illustrates the operation of a Heading Reference Command and Control Algorithm according to one aspect of the invention. With reference to FIG. 1, a pilot 30 is faced with an example of a maneuver in which he or she has to execute a maximum rate hover turn of approximately 90 degrees to point a helicopter 32 at an intended target 34, for example, a tank, within weapons firing constraints. The maneuver may be broken down into three phases in FIG. 1: a first phase, generally indicated at 36 in which the pilot 30 turns the helicopter 32 at a maximum yaw rate toward the target 34 in order to place a cursor 38 displayed along with the target 34 on a visual display device such as a helmet-mounted monocle 40; a second phase, generally indicated at 42, in which the pilot 30 relaxes directional control input force when the cursor 38 is displayed on the monocle 40 over the target 34; and a third phase, generally indicated at 44, in which the helicopter 32 automatically aligns with a heading pointing toward the target 34, within firing constraints.

A Heading Reference Command & Control Algorithm, described in further detail below, makes the rapid turn to target task illustrated in FIG. 1 possible with a reasonable level of pilot workload by providing a "Heading Reference Cue" in the pilot's monocle 40. The monocle 40 may be an Integrated Helmet and Display Sighting System (IHADSS) monocle. The IHADSS monocle may be part of a synthetic vision system, and may project a synthetic image of the outside world, such as, for example, an image generated by a Forward Looking Infrared (FLIR) sensor (not shown). The FLIR image may be a virtual image of the outside world that is enhanced by the FLIR sensor to provide improved vision at night or in other degraded visual environments.

The field of view of the IHADSS monocle may be slaved, or head-tracked, to the pilot's head, thus the pilot 30 may simply turn his or her head to view objects to the left and right of the helicopter 32 through the enhanced vision capabilities of the FLIR sensor. Flight display symbology may be superimposed over the FLIR image in the IHADSS monocle, allowing the pilot 30 to monitor critical flight display parameters while his or her vision is directed outside the cockpit.

The cursor 38 may be a "Heading Reference Cue," that indicates the closest possible heading at which the helicopter 32 can be stopped with no heading overshoot. The "Heading Reference Cue" may be fixed with respect to the virtual image of the outside world depicted by the FLIR imagery in the IHADSS monocle.

When the pilot 30 uses the "Heading Reference Cue," he or she may apply full directional control input and easily command maximum yaw rate during the turn to minimize a time line to a firing solution. As shown in FIG. 1, as the helicopter 32 turns toward the target 34, the "Heading Reference Cue" may move toward the target 34 in the pilot's IHADSS display. When the "Heading Reference Cue" is superimposed over the image of the target 34, the pilot 30 may simply relax directional control input force to command the helicopter 32 to stop at the target heading with no heading overshoot. High fidelity simulations conducted under the Helicopter Active Control Technology (HACT) program predict that the Heading Reference Command & Control Algorithm will decrease time lines to target engagement in the scenario depicted by FIG. 1 by as much as 60% in critical nighttime operational scenarios or in other degraded visual environments.

While the preceding discussion focuses on providing a reference cue for a directional axis targeting task, the concept of providing an attitude reference cue and integrated control laws to lower pilot workload and shorten timelines required to achieve the target attitude may also be applied to the other axis of control. For example, there are mission requirements for pitch axis pointing tasks and limitations on aircraft pitch axis response capabilities that are analogous to those discussed in association with the directional axis task depicted in FIG. 1.

It is straightforward to extend the functionality of the cue depicted in FIG. 1 to serve as an attitude reference for both yaw and pitch axis pointing tasks. For example, the cue in FIG. 1 may move horizontally and vertically with respect to the virtual FLIR image to cue the pilot to both directional and longitudinal axis pointing requirements. When the heading/pitch attitude reference cue is superimposed over the intended target in the FLIR image, the pilot could simultaneously relax input forces in both the longitudinal and directional axis controls to bring the aircraft to the required final heading and pitch attitudes with no overshoot and in the minimum amount of time.

It should be noted that the symbology for the Heading Reference Cue could take many different forms than the symbol shown in FIG. 1. The specific symbol used to depict the Heading Reference Cue in FIG. 1 is presented solely for the purpose of illustrating the concept through a single simplified example. The specific size, shape, color, and geometry of the cue would vary depending upon the specific application. Similarly, multiple sources besides the line of sight from the pilot's eye to the target depicted in FIG. 1 could be used to drive the Heading Reference Cue. For example, lines of sight from Target Acquisition and Designation System (TADS) sensors, which may be located at various points on the aircraft, may be used for targeting tasks.

It should also be noted that the Heading Reference Command and Control Algorithm is equally applicable to aircraft equipped with conventional center stick and pedal cockpit controls or aircraft equipped with sidestick controllers. In an aircraft equipped with conventional directional pedals, the pilot may relax directional control input force by relaxing his leg muscles and allowing the directional pedals to center. In an aircraft equipped with a twist grip sidestick controller to control the yaw axis, the pilot may relax directional control input force by relaxing his wrist muscles and allowing the torsional axis of the sidestick controller to center. The pilot may relax directional control input force at an appropriate time indicated by the cue to command the aircraft to stop at the target heading with equivalent proficiency whether the aircraft is equipped with directional pedals or sidestick controllers.

Figure 2:
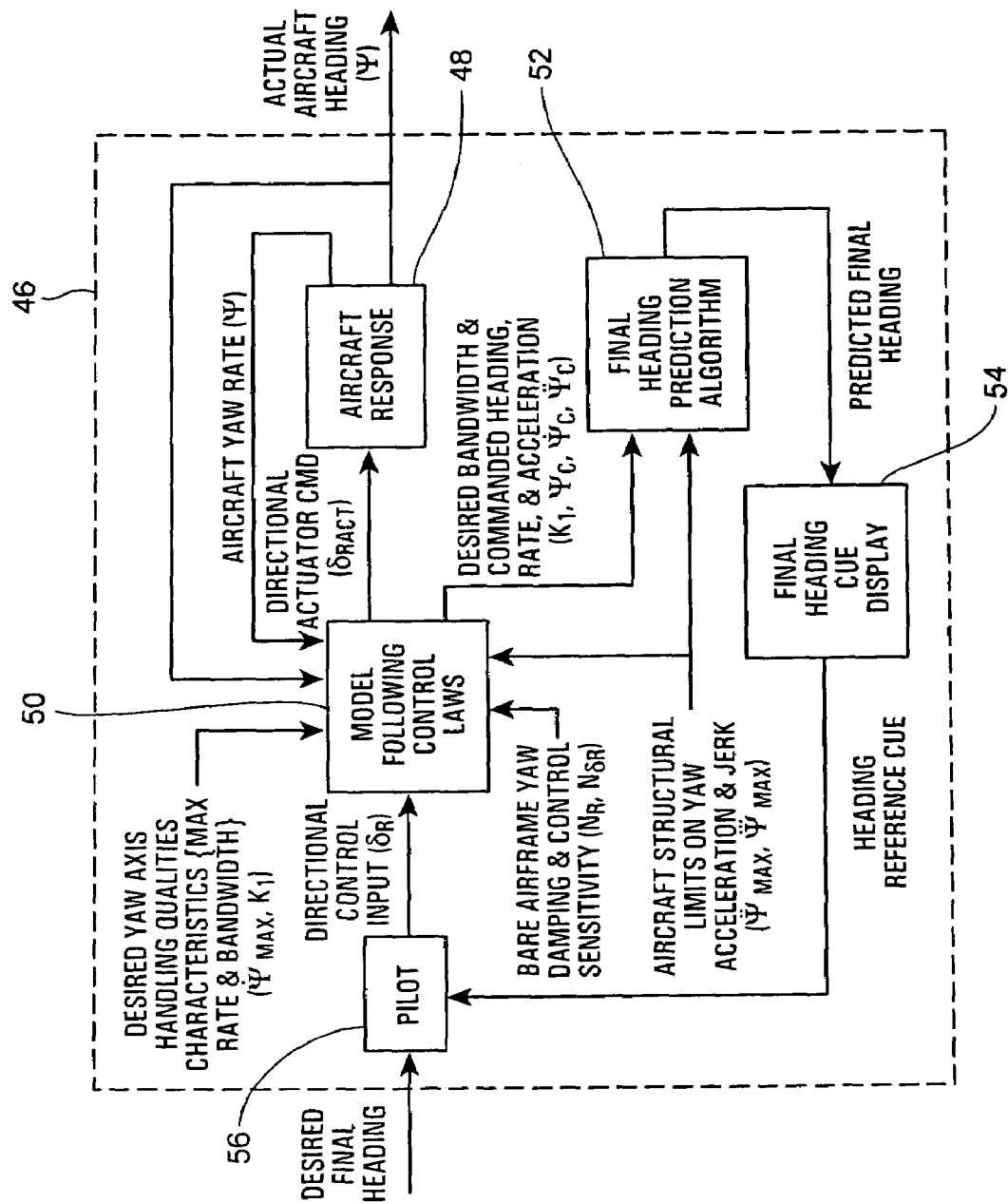
FIG. 2 is a block diagram illustrating a system and method of turning an aircraft according to one aspect of the invention.

FIG. 2 is a block diagram illustrating one example of system level operation of the Heading Reference Command & Control Algorithm. An overall system 46 may include an Aircraft Response Element 48, a Model Following Control Laws Module 50, Final Heading Prediction Algorithm Module 52, a Final Heading Cue Display Module 54, and/or a Pilot response element 56. Referring to FIG. 2, an input to the overall system may be a "Desired Final Heading" and an output of the overall system may be an actual aircraft heading. The Heading Reference Command & Control Algorithm effectively minimizes the error between the actual aircraft heading and the desired final heading by providing the pilot with a display cue that allows the pilot to close the loop on the final heading with a low workload and minimal training.

The Aircraft Response Element 48 represents the basic heading and yaw rate response of the aircraft to a directional actuator command input ($\delta_{RACT}$). For most VTOL aircraft, the basic heading response of the aircraft to actuator commands is too sluggish to provide precise pointing capabilities with a reasonable level of pilot workload. The Model Following Control Laws Module 50 may shape the pilot's directional control inputs to provide crisp heading and yaw rate response characteristics that lower pilot workload required to control the directional axis. The Model Following Control Laws Module 50 may also provide feedback of sensed aircraft heading and yaw rate for disturbance rejection and stability enhancement. The Model Following Control Laws Module 50 may replace the sluggish inherent dynamics of the aircraft, defined approximately by the bare airframe yaw rate damping ($N_R$) and yaw acceleration control sensitivity ($N_{\delta R}$) derivatives, with the desired crisp and predictable yaw axis handling qualities of a first order system with the desired bandwidth ($K_1$) and maximum achievable yaw rate specified by military handling qualities specifications such as Aeronautical Design Standard (ADS) 33.

The Heading Reference Command & Control Algorithm system 46 advances the state of the art by introducing aircraft structural limits on yaw acceleration and jerk into the model following control laws. By limiting actual aircraft yaw acceleration and jerk to the values used as inputs to the Final Heading Prediction Algorithm Module 52, the Model Following Control Laws Module 50 helps to ensure accuracy of the Final Heading Prediction Algorithm Module 52 by rejecting errors between actual and assumed maximum yaw acceleration and jerk capabilities, for example, due to unmodelled aircraft dynamics or atmospheric turbulence. In addition to improving the accuracy of the Final Heading Prediction Algorithm Module 52, the Model Following Control Laws Module 50 may also actively control the helicopter 32 to ensure that the desired final heading is attained with no residual heading error or overshoot when the pilot 30 reacts to the display cue 38 converging with the target 34 by relaxing directional control input force.

While the block diagram shown in FIG. 2 is drawn for the yaw axis, a similar block diagram could be drawn for the pitch axis. The input to the pitch axis block diagram analogous to FIG. 2 would be "Desired Final Pitch Attitude" and its output would be "Aircraft Pitch Attitude." Referring to FIG. 2, the "Final Heading Prediction Algorithm" Module 52 may be replaced by a "Final Pitch Attitude Prediction Algorithm" Module, and the "Final Heading Cue Display" Module 54 may be replaced by a "Final Pitch Attitude Cue Display" Module.

Figure 3:
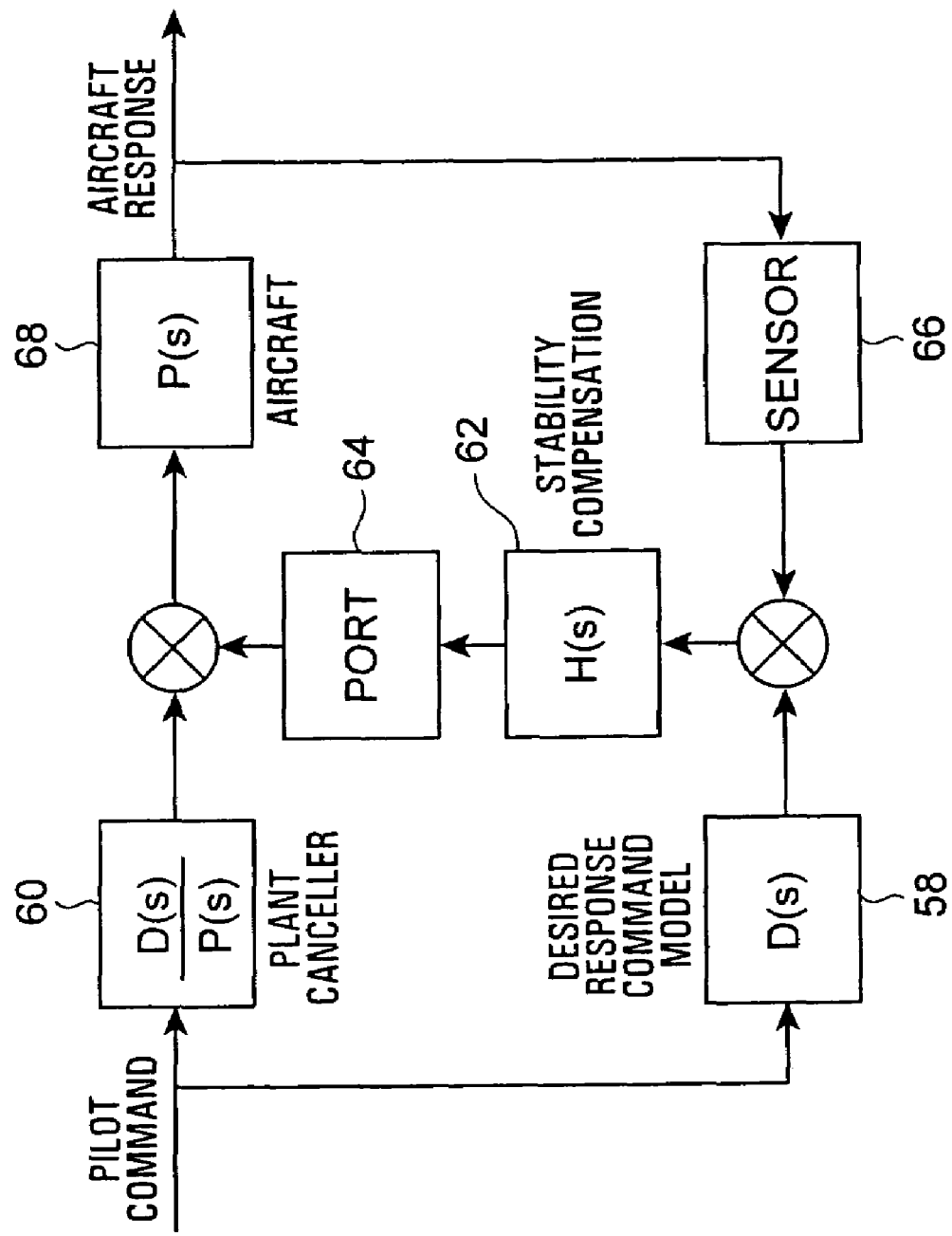
FIG. 3 is a block diagram illustrating a generic architecture that may be used for explicit model following control laws.

FIG. 3 shows a generic architecture that may be used for explicit model following control laws. The generic model following control law architecture provides an aircraft response to pilot commands that is equal to a desired response command model "D(s)" 58. A Plant Canceller Module 60 cancels the inherent aircraft dynamics, denoted by P(s) in FIG. 3, while substituting the desired response of the command model, denoted by D(s) in FIG. 3. Any errors between the desired response command model and sensed aircraft response data may be passed through a Stability Compensation Module 62 and fedback through a Limited Authority Port 64 to actively mitigate model following errors. A Sensor Module 66 may be used to provide the sensed aircraft response data.

Errors between the command model response and actual sensed aircraft response, referred to as model following errors, may be caused by external disturbances such as wind gusts as well as inexact cancellation of the aircraft dynamics by the Plant Canceller Module 60. Since the explicit model following control law architecture minimizes errors between sensed and commanded aircraft response, the output of the Stability Compensation Module 62 may be limited to a relatively small magnitude by the limited authority port without affecting performance of the system. Limiting the port authority provides robustness to sensor failures by allowing the pilot enough authority to easily override any erroneous stability compensation inputs caused by sensor failures. The aircraft module 68 represents the system being controlled by the model following control laws, but of course the system being controlled could be another type of machine, such as a robot arm or a crane, that may need to be precisely pointed in a desired direction.

Figure 4:
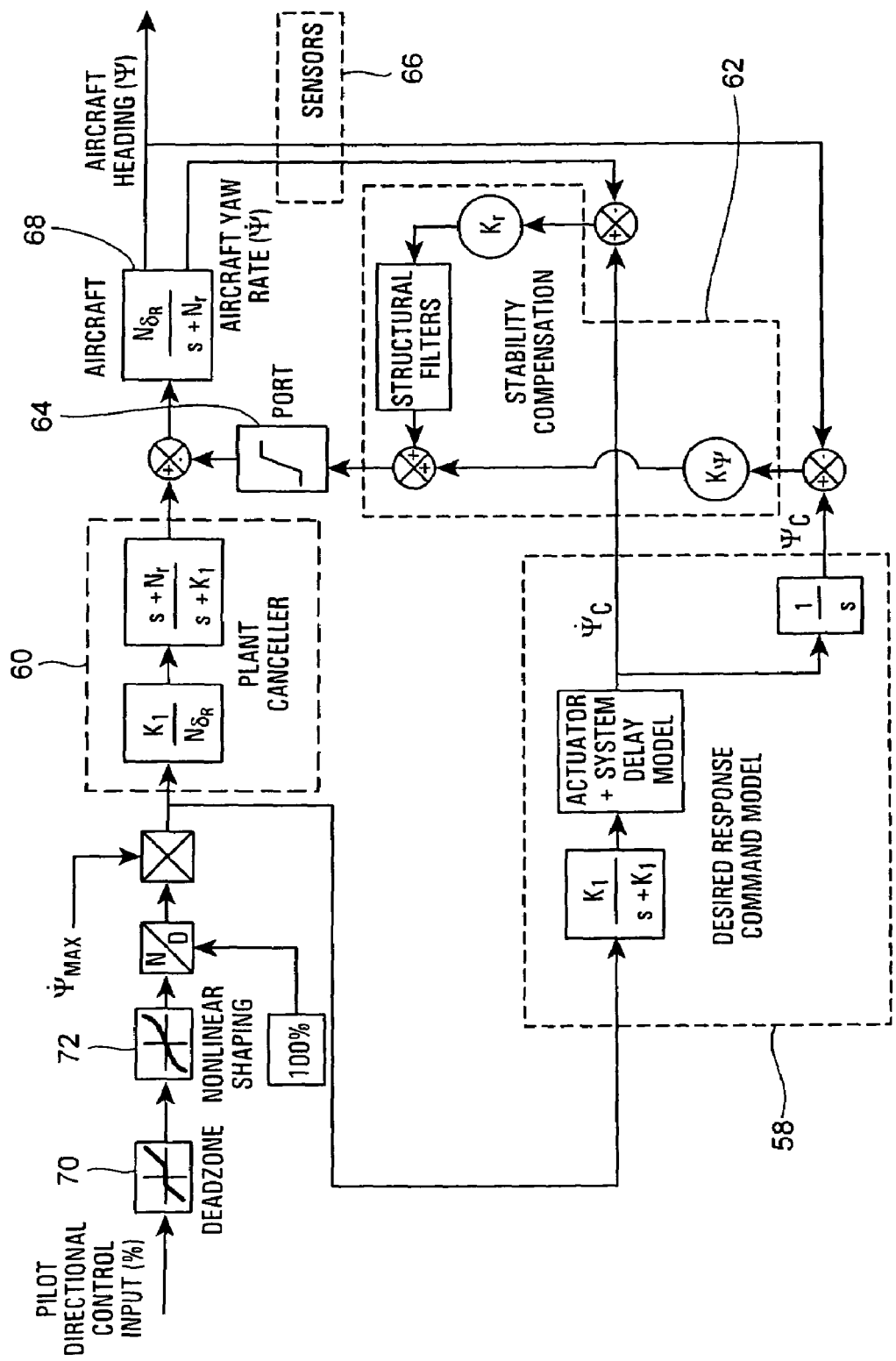
FIG. 4 is a block diagram illustrating the architecture of FIG. 3 in further detail.

FIG. 4 shows how the generic explicit model following control law architecture may be applied to the yaw axis of the aircraft.

D(s)=Transfer Function of Desired Response Command Model

H(s)=Transfer Function of Control Law Stability Compensation Element $K_r$=Yaw Rate Error Feedback Gain (in/(rad/sec))
$K_\Psi$=Heading Error Feedback Gain (in/rad)
$N_R$=Yaw rate damping derivative (rad/sec)
$N_{\delta_R}$=Yaw rate control response derivative (rad/sec^2/in)
P(s)=Transfer Function of Unaugmented Aircraft Response
s=Laplace Variable (rad/sec)
$\delta_R$=Directional Control Input (%)
$\Psi_{MAX}$=Maximum Yaw Rate (Units=Radians/sec)

FIG. 4 shows how the generic explicit model following control law architecture may be applied to the yaw axis of the aircraft.

D(s)=Transfer Function of Desired Response Command Model
H(s)=Transfer Function of Control Law Stability Compensation Element
$K_r$=Yaw Rate Error Feedback Gain (in/(rad/sec))
$K_\Psi$=Heading Error Feedback Gain (in/rad)
$N_R$=Yaw rate damping derivative (rad/sec)
$N_{\delta_R}$=Yaw rate control response derivative (rad/sec^2/in)
P(s)=Transfer Function of Unaugmented Aircraft Response
s=Laplace Variable (rad/sec)
$\delta_R$=Directional Control Input (%)
$\delta_{RACT}$=Directional Actuator Command (in)
$\Psi_{MAX}$=Maximum Yaw Rate (Units=Radians/sec)

The input may be a pilot directional control input in units of percent and the output may be aircraft heading. A small deadzone function 70, on the order of +/−5% of full control authority, may be applied to the pilot directional control input so that the pilot can easily command zero yaw rate by relaxing directional controller input force even if the controller does not return to an exactly centered position. A nonlinear shaping function 72 may be applied to the output of the deadzone so that control sensitivity is lower for small control inputs and higher for larger control inputs. The nonlinear shaping provides precise control for small heading changes while allowing the pilot to exploit full yaw rate capability for large control deflections. The output of the nonlinear shaping may be divided by a factor of 100% and multiplied by the maximum allowable yaw rate to scale the yaw rate command so that a full authority directional control input commands the maximum allowable yaw rate.

The Plant Canceller Module 60 may be designed based on the assumption that the aircraft directional axis dynamics can be represented by a first order response characterized by yaw rate damping and directional control response sensitivity derivatives. The first order response assumed for the aircraft dynamics is an approximation. For example, additional unmodelled dynamics may be present in the aircraft response and the yaw rate damping and directional control response sensitivity derivatives may differ from the assumed values as gross weight, center of gravity, and atmospheric conditions vary.

The explicit model following control law architecture is robust to reasonable discrepancies in assumed and actual aircraft dynamics, therefore adequate plant cancellation is achieved as long as the assumed aircraft dynamics roughly match the actual aircraft dynamics. In general, adequate model following performance is obtained as long as the yaw rate damping and directional control response sensitivity derivatives assumed in the aircraft model are within +/−50% of the values that describe an equivalent first order response model of the actual aircraft dynamics.

As shown in FIG. 4, the Plant Canceller Module 60 may be a function of desired yaw axis control response bandwidth, bare airframe yaw damping, and bare airframe directional control response sensitivity. The yaw rate desired response command model 58 may be formed by cascading a first order lag filter with the desired yaw axis control response bandwidth ($K_1$) with models of actuator dynamics and system digital and transport delays. Commanded yaw rate may be integrated to calculate the commanded heading angle. Yaw rate error may be calculated by subtracting sensed yaw rate from commanded yaw rate. Heading error may be calculated by subtracting sensed heading angle from commanded heading angle. Stability compensation may be calculated by multiplying the yaw rate and heading errors by appropriate feedback gains and structural filters. The stability compensation command may be limited by the port before being fedback to the directional control actuator to provide robustness to sensor failures.

The generic explicit model following control law architecture may also be applied to the pitch axis of the aircraft using the same or similar architecture shown in FIG. 4. Pitch rate damping, pitch control response sensitivity, pitch axis desired bandwidth, maximum pitch rate, pitch attitude feedback gain, and pitch rate feedback gain would replace their yaw axis counterparts in the explicit model following control law architecture block diagram shown in FIG. 4.

Figure 5:
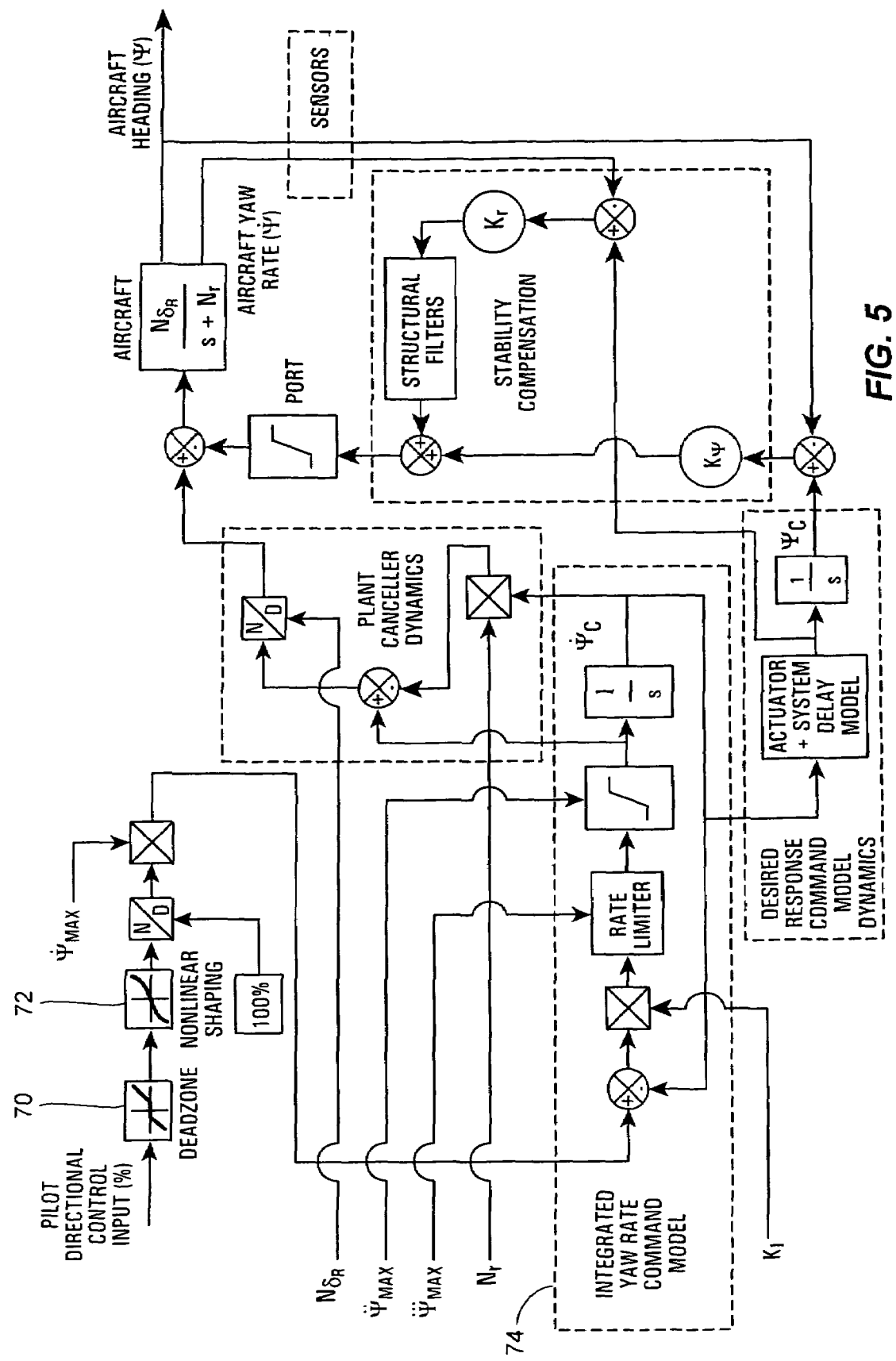
FIG. 5 is a block diagram of a system and method that includes a yaw axis explicit model following control law architecture as modified to perform yaw acceleration and jerk limiting.

FIG. 5 is a block diagram of a system and method that includes a yaw axis explicit model following control law architecture as modified to perform yaw acceleration and jerk limiting. The block diagram of FIG. 5 differs from that of FIG. 4 in that the dynamics of the Plant Canceller Module 60 and desired response command model 58 are combined into an integrated yaw rate command model 74. It is possible to combine the Plant Canceller Module 60 and the desired response command model 58 because the denominators of the transfer functions of both elements contain the same poles. The integrated yaw rate command model calculates commanded yaw rate as the output of an integrator, referred to as the yaw rate command integrator. Authority limiting the input to the yaw rate command integrator limits commanded yaw acceleration, while rate limiting the input to the yaw rate command integrator limits commanded yaw jerk. The explicit model following control law architecture shown in FIG. 5 provides equivalent model following performance as the architecture shown in FIG. 4, while adding the additional capability to limit yaw acceleration and jerk precisely within explicitly specified values.

A pitch axis explicit model following control law architecture that performs acceleration and jerk limiting may also be implemented using architecture analogous to that shown in FIG. 5 with the appropriate substitution of pitch axis parameters for the corresponding yaw axis parameters in FIG. 5.

Figure 6:
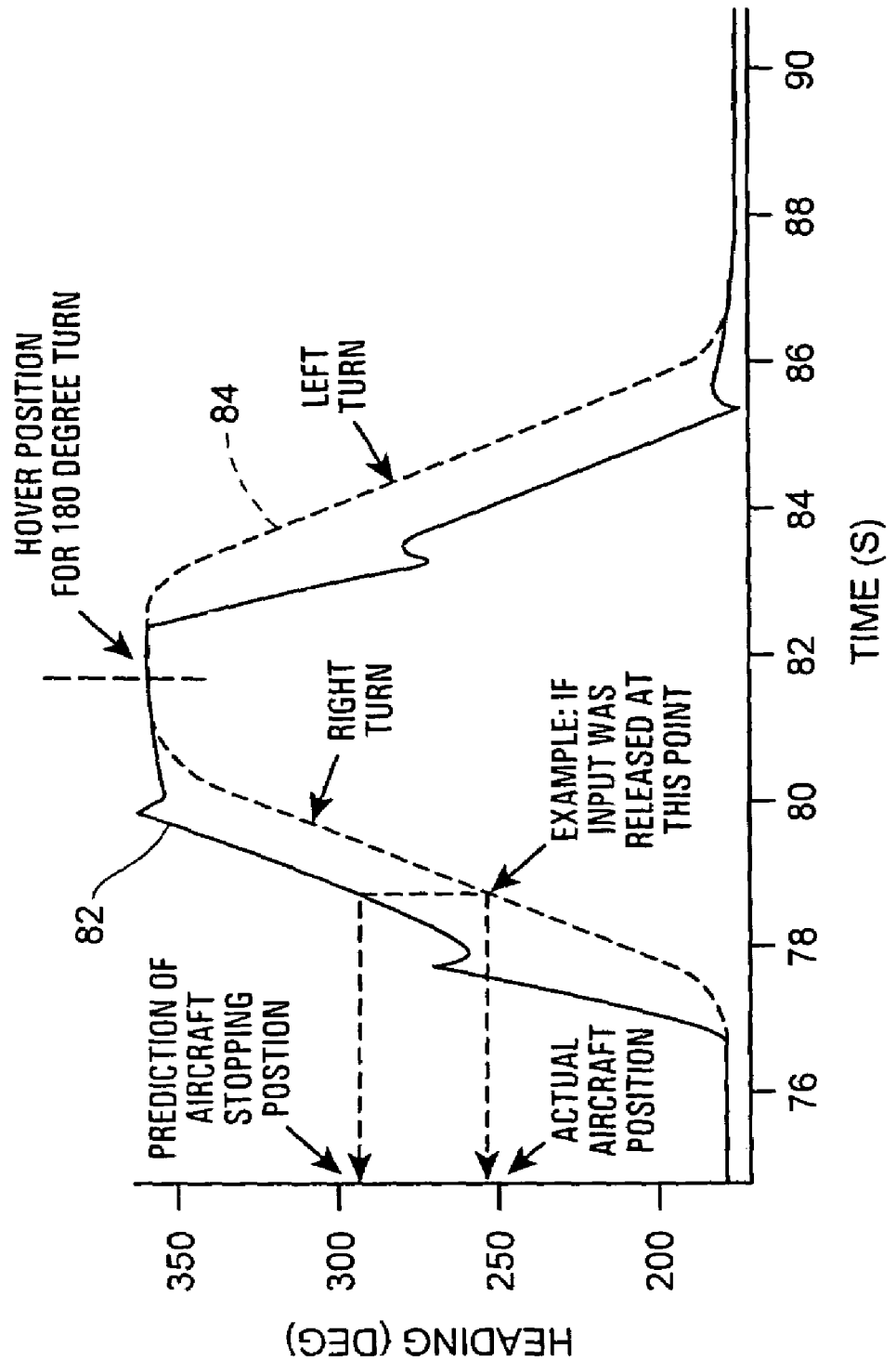
FIG. 6 is a plot that shows a time history of a final heading prediction cue curve overlaying a time history of commanded heading curve for a 180 degree turn of an aircraft implementing the invention.

FIG. 6 shows a time history of the final heading prediction cue curve 82 (solid curve) overlaying a time history of commanded heading curve 84 (dashed curve) for a case where the aircraft performs a 180 degree right turn followed by a 180 degree left turn. The final heading prediction cue calculates the final heading associated with the release of directional control input force. Referring to FIG. 6, at time equal to 76 seconds the time rate of change of heading angle is virtually zero, thus the aircraft can obviously be stopped at the currently commanded heading. Therefore, at time equal to 76 seconds, the final heading prediction is identical to the currently commanded heading angle. Between time equal to 76 and 78 seconds, the time rate of change of heading increases to a large value as the pilot conducts the right turn.

As the time rate of change of heading increases, the final heading prediction cue curve 82 diverges from the commanded heading curve 84, indicating that the final heading that will result from releasing directional control input force will be slewed significantly to the right of the currently commanded heading angle. For example, as illustrated in FIG. 6, at time roughly equal to 78 seconds, the commanded heading is roughly 250 degrees while the predicted final stopping heading is roughly 300 degrees. This means that if the pilot were to release directional control input force at time equal to 78 seconds that the aircraft would continue to yaw an additional 50 degrees before it comes to a stop.

As the heading rate slows between time equal to 80 and 82 seconds, the final heading prediction cue curve 82 once again converges to the commanded heading curve 84. The final heading prediction cue diverges again from the commanded heading curve 84 as the aircraft initiates the left turn between time equal to 82 and 84 seconds, indicating that the final stopping heading will be slewed significantly to the left of the currently commanded heading angle when the leftward time rate of change of heading angle is large.

Figure 7:
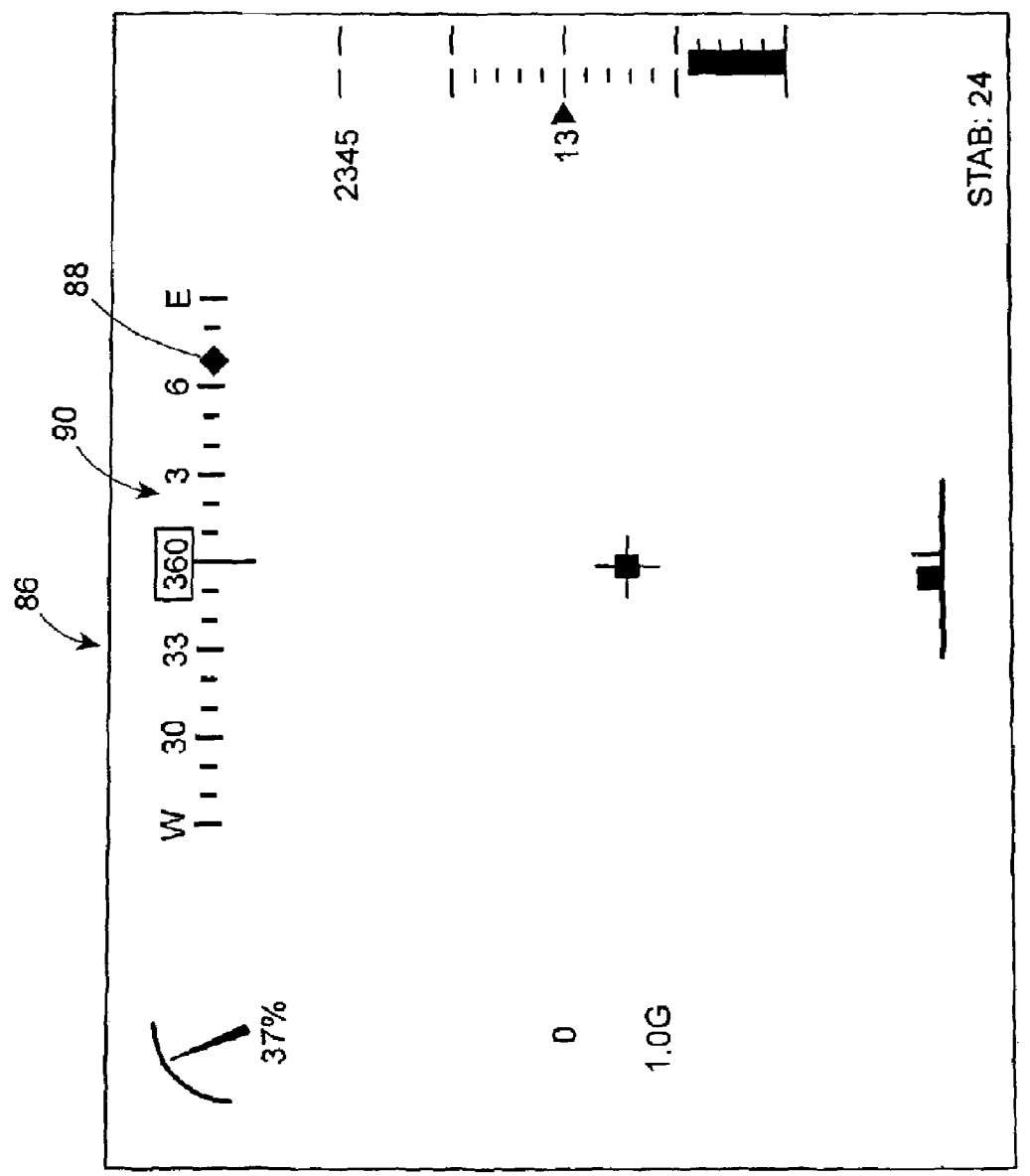
FIG. 7 is an illustration of an exemplary cockpit display that includes a final heading prediction icon according to the invention.

FIG. 7 shows a final heading prediction cue display 86 that can be used as an alternative to the one illustrated in FIG. 1 in aircraft that are not equipped with the synthetic visionics capability and/or head-up flight display capability of the Integrated Helmet And Display Sighting System (IHADSS). The final heading prediction cue display shown in FIG. 7 is a low cost option that indicates the predicted final stopping heading by a diamond shaped symbol 88 displayed on a heading tape 90. The current heading angle is the heading shown in the center of the heading tape 90. The current heading angle may also be boxed to make it easier for the pilot to recognize the current heading angle. FIG. 7 depicts a high yaw rate right hover turn, wherein the current heading angle is 360 degrees and the predicted final stopping heading is 70 degrees.

The simplified heading tape based final heading prediction cue display shown in FIG. 7 can be used in aircraft equipped with night vision goggles as well as aircraft equipped only with conventional head-down flight displays. High fidelity piloted simulations using the final heading prediction cue display of FIG. 7 indicate that this simplified display provides significant benefit for demanding turn to target maneuvers such as those defined in Aeronautical Design Standard 33 (ADS-33).

The U.S. Army developed the ADS-33E Turn to Target Mission Task Element (MTE) to measure directional axis handling qualities, maneuverability, and agility. The Turn to Target Mission Task Element (MTE) defines quantitative adequate and desired performance criteria for heading control and position maintenance for an aggressive 180 degree heading turn. For Level 1 handling qualities in Attack helicopters, ADS-33E requires that the 180 degree Turn to Target MTE be completed in less than 5.0 seconds in daytime conditions and less than 10 seconds in nighttime conditions where the degraded visual environment makes the aircraft harder to fly. Given the current emphasis on nighttime tactics, it would obviously be desirable to provide equivalent agility in the Turn to Target MTE in both day and night visual conditions.

Figure 8:
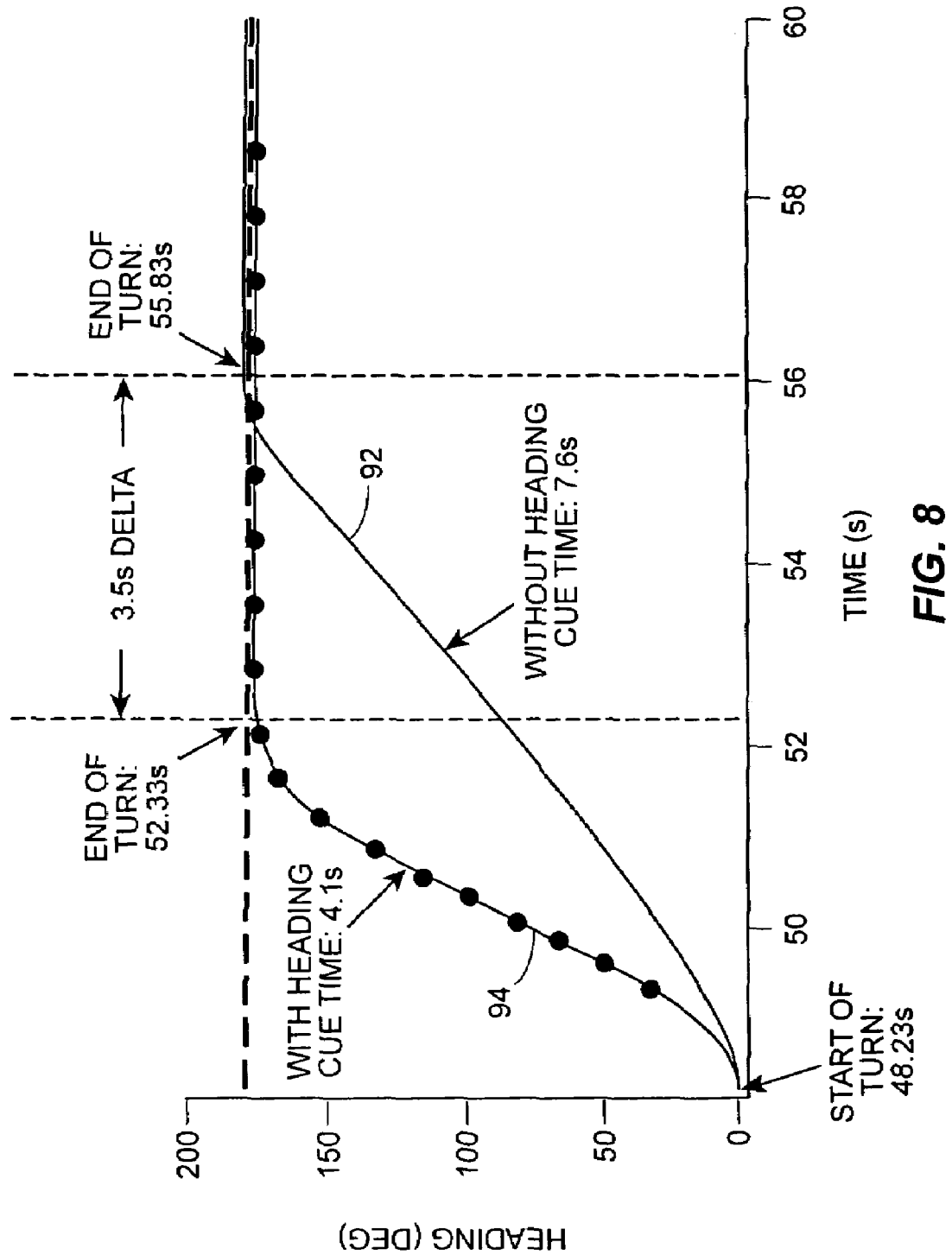
FIG. 8 is a plot that shows piloted simulation predictions for a maneuver in which data are presented for the maneuver conducted with and without using the invention.

FIG. 8 shows piloted simulation predictions for the Turn to Target MTE conducted with an Apache helicopter in nighttime conditions. Data are presented for the Turn to Target maneuver conducted with and without the Final Heading Prediction cue generated by the Heading Reference Command and Control Algorithm. As shown in FIG. 8, it takes 7.6 seconds for the pilot to complete the Turn to Target maneuver without the Final Heading Prediction cue, as indicated by a solid curve 92. When the Final Heading Prediction cue is provided, the pilot is able to reduce the time it takes to perform the maneuver to 4.1 seconds, as indicated by a dotted curve 94. Further, the Final Heading Prediction cue allows the maneuver to be conducted with no heading overshoot, providing an absolutely deadbeat and predictable yaw rate response during the deceleration to the target heading.

Piloted simulation predicts that handling qualities ratings for the Turn to Target MTE improve from CHPR 7 for current fleet Apaches to CHPR 3 when the current fleet Apaches are equipped with a modified flight control system that includes the Heading Reference Command and Control Algorithm. A Cooper-Harper handling qualities rating of 7 indicates that the pilot could not perform the task to even adequate performance standards with the current Apache flight control system even with a high level of pilot workload. A Cooper-Harper handling qualities rating of 3 indicates that the modified flight control system allows the pilot to perform the task to desired performance standards with a low level of pilot workload. Thus the Heading Reference Command and Control Algorithm significantly improves handling qualities while it increases usable maneuverability and agility.

Figure 9:
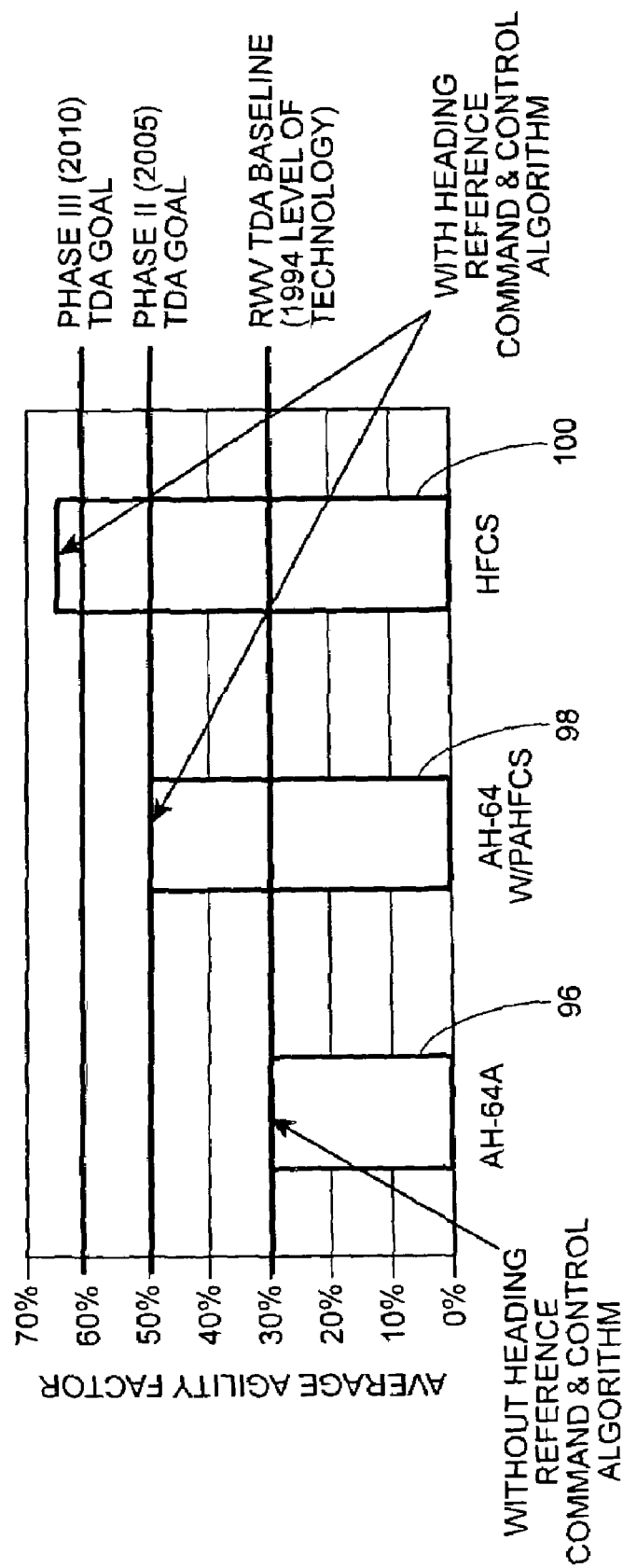
FIG. 9 is bar graph that shows an average agility factor for three differently configured aircraft.

FIG. 9 is a bar graph that quantifies the progress toward achievement of the U.S. Department of Defense's (DoD's) Rotary Wing Vehicle Technology Development Approach (RWV TDA) Subarea Goals for maneuverability and agility resulting from using flight control systems that incorporate the Heading Reference Command and Control Algorithm according to one aspect of the invention. The data shown in FIG. 9 quantify improvements in Usable Agility/Maneuverability that were measured within the context of the U.S. Army HACT Science and Technology program. The metric for this Subarea Goal is average usable agility factor in aggressive maneuvers. Agility factor is defined as the ratio of usable performance to inherent performance that is attainable by service pilots in combat conditions. Inherent performance is defined as the aircraft performance limit with "ideal" pilot compensation. Usable agility factor is averaged over the Turn to Target maneuver as well as Bob-up/Bob-down, Pirouette, Slalom, and Pull-up/Pushover maneuvers performed in both day and Degraded Visual Environment (DVE) conditions. For the Turn to Target maneuver, the usable agility metric is the ratio of the time required to complete the Turn to Target maneuver in an AH-64 Apache helicopter with "ideal" pilot compensation, calculated as 4.1 seconds by the DoD, to the time it takes an actual pilot to complete the maneuver while maintaining at least Level 2 handling qualities. Note that Level 2 handling qualities correspond to Cooper-Harper handling qualities ratings of 4 through 6.

The current fleet Apache AH-64A flight control system allows service pilots to exploit only 30% of the agility inherent in the Apache airframe as indicated by a left-hand bar 96 in FIG. 9. Implementation of a Partial Authority HACT Flight Control System (PAHFCS) that includes the Heading Reference Command & Control Algorithm into a force modernized Apache helicopter is predicted to increase average usable agility factor by 66%, allowing service pilots to exploit 50% of the agility inherent in the Apache airframe as indicated by a center bar 98 in FIG. 9. Note that the PAHFCS utilizes the mechanical flight control system implemented in current fleet Apache helicopters. Current fleet Apache helicopters augment the pilot's direct mechanical control inputs with inputs from limited authority stability augmentation actuators whose control authority is limited to only roughly +/−10% of the pilot's total control authority. Thus the current fleet Apache flight control actuator hardware is referred to as a "Partial Authority" flight control augmentation system because the actuators used for stability and control augmentation have only "part" of the authority available to the pilot. An Apache upgrade with the PAHFCS is a relatively low cost option for increasing usable agility in the Apache, requiring extensive flight control computer software changes but minimal flight control hardware changes. A partial authority HFCS upgrade including the Heading Reference Command & Control Algorithm is predicted to achieve the 2005 RWV TDA Maneuverability/Agility Subarea Goal.

A more capable but more expensive design option would be to replace the mechanical flight control system currently used in the Apache with a Fly-By-Wire flight control system that allows the HFCS to command full actuator authority. The full authority HFCS upgrade would require extensive flight control hardware changes and extensive flight control computer processor and software changes. As shown by the right bar 100 in FIG. 9, the full authority. HFCS implementation would allow pilots to exploit roughly 65% of the agility inherent in the Apache airframe, achieving the year 2010 RWV TDA Agility/Maneuverability Subarea Goal.

The DoD defines connectivity between the "Increase in Usable Agility/Maneuverability Subarea Goal" and System Level Payoffs in the RWV TDA. For example, attaining the 2005 (Phase 2) Agility/Maneuverability Subarea Goal is predicted to increase mission capability by 65%, reduce major accident rate by 10%, increase probability of survival by 4.5%, and increase mission reliability by 20% in comparison to current fleet Apache helicopters. Thus the Heading Reference Command & Control Algorithm is predicted to have significant benefits in expanding mission capability, increasing flight safety, improving survivability, and increasing mission reliability.

In accordance with one aspect of the invention, a final heading prediction algorithm may be derived and based upon the solution to the continuous time domain control problem. A general derivation of a heading reference command and control algorithm is set forth below.

GENERAL DERIVATION OF HEADING REFERENCE COMMAND & CONTROL ALGORITHM

There exists a state: X.

Its derivatives exist: $\dot{X}, \ddot{X}, \dddot{X}, \ldots$

Limits on the derivatives are defined: $\dot{X}_{MAX}, \ddot{X}_{MAX},$ and $\dddot{X}_{MAX}$ such that $|\dot{X}| \leq \dot{X}_{MAX}$ etc.

The basic relationships are defined as exponential:

$$\dot{X} = -KX$$

Thus: $\ddot{X} = -K\dot{X}, \dddot{X} = -K\ddot{X}, \ddot{X} = K^2 X, \dddot{X} = -K^3 X$ etc.

Given an arbitrary initial condition, an optimal "at rest" condition may be achieved as follows:

Initial condition defined as:

$$\dot{X} = \dot{X}_0, \ddot{X} = \ddot{X}_0, \dddot{X} = \text{undefined}$$

"At rest" is defined as all derivative states=0.

There are two basic conditions that may exist.
1. The acceleration (deceleration) profile must be "captured".
2. The acceleration profile is being tracked.
   a. Constant (maximum) deceleration is active.
   b. Exponential curve is being tracked.

Starting from an arbitrary initial condition the capture may be to either the potential or the constant (maximum) acceleration portions of the profile.

To the exponential:

$$t_{1_{exp}} = \frac{-K\left(\dot{X}_0 + \ddot{X}_0 t_{1_{exp}} - \dddot{X}_{MAX}\text{sign}(\dot{X}_0)\frac{t^2_{1_{exp}}}{2}\right) - \ddot{X}_0}{-\dddot{X}_{MAX}\text{sign}(\dot{X}_0)}$$

$$t^2_{1_{exp}} = \frac{2(K(\ddot{X}_0) - \dddot{X}_{MAX}\text{sign}(\dot{X}_0))}{K(\dddot{X}_{MAX}\text{sign}(\dot{X}_0))}t_{1_{exp}} - \frac{2(K(\dot{X}_0) + \ddot{X}_0)}{K(\dddot{X}_{MAX}\text{sign}(\dot{X}_0))} = 0$$

$$t_{1_{exp}} = \frac{K(\ddot{X}_0) - \dddot{X}_{MAX}\text{sign}(\dot{X}_0)}{K(\dddot{X}_{MAX}\text{sign}(\dot{X}_0))} + \sqrt{\left(\frac{K(\ddot{X}_0) - \dddot{X}_{MAX}\text{sign}(\dot{X}_0)}{K(\dddot{X}_{MAX}\text{sign}(\dot{X}_0))}\right)^2 + \frac{2(K(\dot{X}_0) + \ddot{X}_0)}{K(\dddot{X}_{MAX}\text{sign}(\dot{X}_0))}}$$

$$\Delta \dot{X}_{1exp} = \ddot{X}_0 t_{1_{exp}} - \dddot{X}_{MAX}\text{sign}(\dot{X}_0)\frac{t^2_{1_{exp}}}{2}$$

$$\Delta X_{1exp} = \dot{X}_0 t_{1_{exp}} + \ddot{X}_0 \frac{t^2_{1_{exp}}}{2} - \dddot{X}_{MAX}\text{sign}(\dot{X}_0)\frac{t^3_{1_{exp}}}{6}$$

To the constant acceleration:

$$t_{1_{max}} = \frac{-\ddot{X}_{MAX}\text{sign}(\dot{X}_0) - \ddot{X}_0}{-\dddot{X}_{MAX}\text{sign}(\dot{X}_0)}$$

$$\Delta \dot{X}_{1_{MAX}} = \ddot{X}_0 t_{1_{MAX}} - \dddot{X}_{MAX}\text{sign}(\dot{X}_0)\frac{t^2_{1_{MAX}}}{2}$$

$$\Delta X_{1_{MAX}} = \dot{X}_0 t_{1_{MAX}} + \ddot{X}_0 \frac{t^2_{1_{MAX}}}{2} - \dddot{X}_{MAX}\text{sign}(\dot{X}_0)\frac{t^3_{1_{MAX}}}{6}$$

If $t_{1_{MAX}} \leq t_{1_{exp}}$ then:

$$\Delta X_1 = \Delta X_{1_{MAX}}$$

$$t_2 = \frac{\dot{X}_0 + \Delta \dot{X}_{1_{MAX}} - \frac{\ddot{X}_{MAX}\text{sign}(\dot{X}_0)}{K}}{\ddot{X}_{MAX}\text{sign}(\dot{X}_0)}$$

$$\Delta \dot{X}_2 = -\ddot{X}_{MAX}\text{sign}(\dot{X}_0) t_2$$

$$\Delta X_2 = (\dot{X}_0 + \Delta \dot{X}_{1_{MAX}})t_2 - \ddot{X}_{MAX}\text{sign}(\dot{X}_0)\frac{t_2^2}{2}$$

$$\Delta X_3 = \frac{\ddot{X}_{MAX}\text{sign}(\dot{X}_0)}{K^2}$$

Else:

$$\Delta X_1 = \Delta X_{1_{exp}}$$

$$\Delta X_2 = 0$$

$$\Delta X_3 = \frac{\dot{X}_0 + \Delta \dot{X}_{1_{exp}}}{K}$$

The algorithm may be based on a set of equations that allow the "final heading reference" to be computed continuously. Calculations may be based on knowing the yaw bandwidth (K), yaw rate command $\Psi_c$ "derived from the stick", maximum yaw rate $\Psi_{MAX}$, maximum yaw acceleration $\ddot{\Psi}_{MAX}$, and maximum jerk rate $\dddot{\Psi}_{MAX}$ of the aircraft. Based on this aircraft information an algorithm was derived that predicts the heading response for a given yaw rate command. The algorithm is set forth below.

$$\text{IF}\left(\text{abs}(\Psi_c) \le \frac{\dot\Psi_{MAX}}{K_1}\right) \text{THEN}$$

$$t_1 = \frac{-K_1 * (\Psi_C + \Delta\Psi'_1) - \Psi_C}{-\ddot\Psi_{MAX} * \text{SIGN}(\dot\Psi_C)}$$

$$\Delta\Psi'_1 = \dot\Psi_C * t_1 - \ddot\Psi_{MAX} * \text{SIGN}(\dot\Psi_C) * \frac{t_1^2}{2.0}$$

$$\Delta\Psi_1 = \dot\Psi_C * t_1 - \ddot\Psi_C * \frac{t_1^2}{2.0} - \ddot\Psi_{MAX} * \text{SIGN}(\dot\Psi_C) * \frac{t_1^3}{6.0}$$

$$\Delta\Psi = \frac{\dot\Psi_C + \Delta\Psi'_1}{K_1} + \Delta\Psi_1$$

ELSE $$t_1 = \frac{-\ddot\Psi_{MAX} * \text{SIGN}(\dot\Psi_C) - \ddot\Psi_C}{-\dddot\Psi_{MAX} * \text{SIGN}(\dot\Psi_C)}$$

$$\Delta\Psi_1 = \dot\Psi_C * t_1 - \ddot\Psi_{MAX} * \text{SIGN}(\dot\Psi_C) * \frac{t_1^2}{2.0}$$

$$\Delta\Psi_1 = \dot\Psi_C * t_1 + \ddot\Psi_C * \frac{t_1^2}{2.0} \dddot\Psi_{MAX} * \text{SIGN}(\dot\Psi_C) * \frac{t_1^3}{6.0}$$

$$t_2 = \frac{\dot\Psi_C + \Delta\dot\Psi_1 - \frac{\ddot\Psi_{MAX} * \text{SIGN}(\dot\Psi_C)}{K_1}}{\ddot\Psi_{MAX} * \text{SIGN}(\dot\Psi_C)}$$

$$\Delta\Psi_2 = (\dot\Psi_C + \Delta\dot\Psi_1) * t_2 - \ddot\Psi_{MAX} * \text{SIGN}(\dot\Psi_C) * \frac{t_2^2}{2.0}$$

$$\Delta\Psi_3 = \frac{\ddot\Psi_{MAX} * \text{SIGN}(\dot\Psi_C)}{K_1^2}$$

$$\Delta\Psi = \Delta\Psi_1 + \Delta\Psi_2 + \Delta\Psi_3$$

ENDIF $$\Psi_{PREDICTION} = \Psi_C + \Delta\Psi$$

Where,
$\Psi_c$=Yaw Command (Units=Radians)
$\dot\Psi_c$=Yaw Rate Command (Units=Radians/sec)
$\ddot\Psi_c$=Commanded Yaw Acceleration (Units=Radians/sec^2)
$\ddot\Psi_{MAX}$=Yaw Acceleration Limit "Max Acceleration" (Units=Radians/sec^2)
$\dddot\Psi_{MAX}$=Yaw Jerk Limit "Maximum Jerk" (Units=Radians/sec^3)
K=Yaw Desired Bandwidth (Units=Radians/sec)

Note the algorithm is broken in two parts, resulting in $\Delta\Psi$ being calculated differently depending upon the state of $$\left(\text{abs}(\dot\Psi_c) \le \frac{\ddot\Psi_{MAX}}{K}\right).$$

Both PSI dot and double dot are signals generated within the Yaw Axis Command model. They are labeled as Yaw Rate Command and Command Yaw Acceleration respectively. Both the Yaw Rate Command and Commanded Yaw Acceleration result from the pilot's directional input in lieu of limits such as Max Yaw Rate, Desired Yaw Bandwidth, etc. Note the Yaw Command may be derived in the Attitude Command Model as a Time Rate of Charge of Aircraft Heading Angle Command, alternatively referred to as an Inertial Yaw Rate Command coming from the Yaw Axis Command Model. Since helicopters often hover at non-zero pitch and roll angles, it is preferable to yaw about earth-fixed, or inertial, axes rather than yaw about the aircraft body axes for hover pointing tasks.

A variant of the foregoing algorithm has been found to perform well in a fully-digital rotorcraft control system, and is set forth below:

$$\text{IF}\left(\text{abs}(\dot\Psi_c) \le \frac{\ddot\Psi_{MAX}}{K}\right)\text{THEN}$$

$$t'_1 = \frac{-K * \dot\Psi_C + \ddot\Psi_C}{-\dddot\Psi_{MAX} * \text{SIGN}(\ddot\Psi_C)}$$

$$\Delta\dot\Psi'_1 = \ddot\Psi_C * t'_1 - \dddot\Psi_{MAX} * \text{SIGN}(\ddot\Psi_C) * \frac{(t'_1)^2}{2.0}$$

$$t_1 = \frac{-K * (\dot\Psi_C + \Delta\dot\Psi'_1) - \ddot\Psi_C}{-\dddot\Psi_{MAX} * \text{SIGN}(\ddot\Psi_C)}$$

$$\Delta\Psi_1 = \dot\Psi_C * t_1 - \ddot\Psi_{MAX} * \text{SIGN}(\ddot\Psi_C) * \frac{t_1^2}{2.0}$$

$$\Delta\Psi_1 = \dot\Psi_C * t_1 + \ddot\Psi_C * \frac{t_1^2}{2.0} - \dddot\Psi_{MAX} * \text{SIGN}(\ddot\Psi_C) * \frac{t_1^3}{6.0}$$

$$\Delta\Psi = \frac{\dot\Psi_C + \Delta\dot\Psi_1}{K} + \Delta\Psi_1$$

ELSE $$t_1 = \frac{-\ddot\Psi_{MAX} * \text{SIGN}(\ddot\Psi_C) - \ddot\Psi_C}{-\dddot\Psi_{MAX} * \text{SIGN}(\ddot\Psi_C)}$$

$$\Delta\Psi_1 = \dot\Psi_C * t_1 - \ddot\Psi_{MAX} * \text{SIGN}(\ddot\Psi_C) * \frac{t_1^2}{2.0}$$

$$\Delta\Psi_1 = \dot\Psi_C * t_1 + \ddot\Psi_C * \frac{t_1^2}{2.0} - \dddot\Psi_{MAX} * \text{SIGN}(\ddot\Psi_C) * \frac{t_1^3}{6.0}$$

$$t_2 = \frac{\dot\Psi_C + \Delta\dot\Psi_1 - \frac{\ddot\Psi_{MAX} * \text{SIGN}(\ddot\Psi_C)}{K}}{\ddot\Psi_{MAX} * \text{SIGN}(\ddot\Psi_C)}$$

$$\Delta\Psi_2 = (\dot\Psi_C + \Delta\dot\Psi_1) * t_2 - \ddot\Psi_{MAX} * \text{SIGN}(\ddot\Psi_C) * \frac{t_2^2}{2.0}$$

$$\Delta\Psi_3 = \frac{\ddot\Psi_{MAX} * \text{SIGN}(\ddot\Psi_C)}{K^2}$$

$$\Delta\Psi = \Delta\Psi_1 + \Delta\Psi_2 + \Delta\Psi_3$$

ENDIF $$\Psi_{PREDICTION} = \Psi_C + \Delta\Psi$$

The variant of a heading prediction algorithm set forth above explicitly defines and updates all possible states calculated by the heading prediction algorithm during each digital update cycle of the flight control computer, ensuring constant computational throughput and timing requirements for the heading prediction algorithm and eliminating any possibility of computational overflow or underflow conditions resulting from ill conditioned inputs to the heading prediction algorithm. This is a robust heading prediction algorithm that eliminates the potential for computational singularities that may exist in previous alternative heading prediction algorithms when those algorithms are used to predict the terminal heading of aircraft that are compliant with ADS-33 handling qualities specifications.

As still further alternatives, the following heading prediction implementations have also been developed and are set forth below.

Exact Solution Implementation of Final Heading Reference Algorithm

To the constant acceleration:

$$t_{1_{CA}} = \frac{\ddot{\psi}_{MAX}\text{sign}(\dot{\psi}_C) + \ddot{\psi}_C}{\dddot{\psi}_{MAX}\text{sign}(\dot{\psi}_C)}$$

If $t_{1_{CA}} < 0$ then $t_{1_{CA}} = 0$ $$\Delta\dot{\psi}_{1_{MAX}} = \ddot{\psi}_C t_{1_{CA}} - \dddot{\psi}_{MAX}\text{sign}(\dot{\psi}_C)\frac{t_{1_{CA}}^2}{2}$$

$$t_2 = \frac{\dot{\psi}_C + \Delta\dot{\psi}_{1_{MAX}}}{\ddot{\psi}_{MAX}\text{sign}(\dot{\psi}_C)} - \frac{1}{K}$$

If $t_2 > 0$ Then:

$$\Delta\psi_{1_{MAX}} = \dot{\psi}_C t_{1_{CA}} + \ddot{\psi}_C \frac{t_{1_{CA}}^2}{2} - \dddot{\psi}_{MAX}\text{sign}(\dot{\psi}_C)\frac{t_{1_{CA}}^3}{6}$$

$$\Delta\dot{\psi}_2 = -\ddot{\psi}_{MAX}\text{sign}(\dot{\psi}_C) t_2$$

$$\Delta\psi_2 = (\dot{\psi}_C + \Delta\dot{\psi}_{1_{MAX}})t_2 - \ddot{\psi}_{MAX}\text{sign}(\dot{\psi}_C)\frac{t_2^2}{2}$$

$$\Delta\psi_3 = \frac{\ddot{\psi}_{MAX}\text{sign}(\dot{\psi}_C)}{K^2}$$

$$\Delta\psi = \Delta\psi_{1_{MAX}} + \Delta\psi_2 + \Delta\psi_3$$

Else:

To the exponential:

$$t_{1_{exp}} = \frac{K\ddot{\psi}_C - \dddot{\psi}_{MAX}\text{sign}(\dot{\psi}_C)}{K\dddot{\psi}_{MAX}\text{sign}(\dot{\psi}_C)} + \sqrt{\left(\frac{K\ddot{\psi}_C - \dddot{\psi}_{MAX}\text{sign}(\dot{\psi}_C)}{K\dddot{\psi}_{MAX}\text{sign}(\dot{\psi}_C)}\right)^2 + \frac{2(K\dot{\psi}_C + \ddot{\psi}_C)}{K\dddot{\psi}_{MAX}\text{sign}(\dot{\psi}_C)}}$$

$$\Delta\dot{\psi}_{1_{exp}} = \ddot{\psi}_C t_{1_{exp}} - \dddot{\psi}_{MAX}\text{sign}(\dot{\psi}_C)\frac{t_{1_{exp}}^2}{2}$$

$$\Delta\psi_{1_{exp}} = \dot{\psi}_C t_{1_{exp}} + \ddot{\psi}_C \frac{t_{1_{exp}}^2}{2} - \dddot{\psi}_{MAX}\text{sign}(\dot{\psi}_C)\frac{t_{1_{exp}}^3}{6}$$

$$\Delta\psi_3 = \frac{\dot{\psi}_C + \Delta\dot{\psi}_{1_{exp}}}{K}$$

$$\Delta\psi = \Delta\psi_{1_{exp}} + \Delta\psi_3$$

End if $$\psi_{PREDICTION} = \psi_C + \Delta\psi$$

Iterative Solution Implementation of Final Heading Reference Algorithm

To the constant acceleration:

$$t_{1_{CA}} = \frac{\ddot{\psi}_{MAX}\text{sign}(\dot{\psi}_C) + \ddot{\psi}_C}{\dddot{\psi}_{MAX}\text{sign}(\dot{\psi}_C)}$$

If $t_{1_{CA}} < 0$ then $t_{1_{CA}} = 0$ $$\Delta\dot{\psi}_{1_{MAX}} = \ddot{\psi}_C t_{1_{CA}} - \dddot{\psi}_{MAX}\text{sign}(\dot{\psi}_C)\frac{t_{1_{CA}}^2}{2}$$

$$t_2 = \frac{\dot{\psi}_C + \Delta\dot{\psi}_{1_{MAX}}}{\ddot{\psi}_{MAX}\text{sign}(\dot{\psi}_C)} - \frac{1}{K}$$

If $t_2 > 0$ Then:

$$\Delta\psi_{1_{MAX}} = \dot{\psi}_C t_{1_{CA}} + \ddot{\psi}_C \frac{t_{1_{CA}}^2}{2} - \dddot{\psi}_{MAX}\text{sign}(\dot{\psi}_C)\frac{t_{1_{CA}}^2}{6}$$

$$\Delta\dot{\psi}_2 = -\ddot{\psi}_{MAX}\text{sign}(\dot{\psi}_C) t_2$$

$$\Delta\psi_2 = (\dot{\psi}_C + \Delta\dot{\psi}_{1_{MAX}})t_2 - \ddot{\psi}_{MAX}\text{sign}(\dot{\psi}_C)\frac{t_2^2}{2}$$

$$\Delta\psi_3 = \frac{\ddot{\psi}_{MAX}\text{sign}(\dot{\psi}_C)}{K^2}$$

$$\Delta\psi = \Delta\psi_{1_{MAX}} + \Delta\psi_2 + \Delta\psi_3$$

Else:

To the exponential:

$$t_{1_{exp}} = \frac{K*(\Psi_C + \Delta\Psi_1') + \Psi_C}{\Psi_{MAX}*\text{SIGN}(\Psi_C)}$$

$$\Delta\Psi_1' = \Psi_C * t_{1_{exp}} - \Psi_{MAX}*\text{SIGN}(\Psi_C)*\frac{t_{1_{exp}}^2}{2.0}$$

$$\Delta\Psi_1 = \Psi_C * t_{1_{exp}} + \Psi_C * \frac{t_{1_{exp}}^2}{2.0} - \Psi_{MAX}*\text{SIGN}(\Psi_C)*\frac{t_{1_{exp}}^3}{6.0}$$

$$\Delta\psi_3 = \frac{\dot{\psi}_C + \Delta\Psi_1'}{K}$$

$$\Delta\psi = \Delta\psi_1 + \Delta\psi_3$$

End if $$\psi_{PREDICTION} = \psi_C + \Delta\psi$$

Approximate Solution Implementation of Final
Heading Reference Algorithm

To the constant acceleration:

$$t_{1_{CA}} = \frac{\ddot{\psi}_{MAX}\text{sign}(\dot{\psi}_C) + \ddot{\psi}_C}{\dddot{\psi}_{MAX}\text{sign}(\dot{\psi}_C)}$$

If $$t_{1_{CA}} < 0$$

then $$t_{1_{CA}} = 0$$

$$\Delta\dot{\psi}_{1_{MAX}} = \ddot{\psi}_C t_{1_{CA}} - \dddot{\psi}_{MAX}\text{sign}(\dot{\psi}_C)\frac{t^2_{1_{CA}}}{2}$$

$$t_2 = \frac{\dot{\psi}_C + \Delta\dot{\psi}_{1_{MAX}}}{\ddot{\psi}_{MAX}\text{sign}(\dot{\psi}_C)} - \frac{1}{K}$$

If $t_2 > 0$ Then:

$$\Delta\psi_{1_{MAX}} = \dot{\psi}_C t_{1_{CA}} + \ddot{\psi}_C \frac{t^2_{1_{CA}}}{2} - \dddot{\psi}_{MAX}\text{sign}(\dot{\psi}_C)\frac{t^3_{1_{CA}}}{6}$$

$$\Delta\dot{\psi}_2 = -\ddot{\psi}_{MAX}\text{sign}(\dot{\psi}_C) t_2$$

$$\Delta\psi_2 = (\dot{\psi}_C + \Delta\dot{\psi}_{1_{MAX}})t_2 - \ddot{\psi}_{MAX}\text{sign}(\dot{\psi}_C)\frac{t^2_2}{2}$$

$$\Delta\psi_3 = \frac{\ddot{\psi}_{MAX}\text{sign}(\dot{\psi}_C)}{K^2}$$

$$\Delta\psi = \Delta\psi_{1_{MAX}} + \Delta\psi_2 + \Delta\psi_3$$

Else:
To the exponential:

$$t'_{1_{exp}} = \frac{K * \ddot{\Psi}_C + \dot{\Psi}_C}{\ddot{\Psi}_{MAX} * \text{SIGN}(\dot{\Psi}_C)}$$

$$\Delta\dot{\Psi}'_1 = \ddot{\Psi}_C * t'_{1_{exp}} - \dddot{\Psi}_{MAX} * \text{SIGN}(\dot{\Psi}_C) * \frac{t'^2_{1_{exp}}}{2.0}$$

$$t_{1_{exp}} = \frac{K * (\ddot{\Psi}_C + \Delta\dot{\Psi}'_1) + \dot{\Psi}_C}{\ddot{\Psi}_{MAX} * \text{SIGN}(\dot{\Psi}_C)}$$

$$\Delta\dot{\Psi}_1 = \ddot{\Psi}_C * t_{1_{exp}} - \dddot{\Psi}_{MAX} * \text{SIGN}(\dot{\Psi}_C) * \frac{t^2_{1_{exp}}}{2.0}$$

$$\Delta\Psi_1 = \dot{\Psi}_C * t_{1_{exp}} + \ddot{\Psi}_C * \frac{t^2_{1_{exp}}}{2.0} - \dddot{\Psi}_{MAX} * SIGN(\dot{\Psi}_C) * \frac{t^3_{1_{exp}}}{6.0}$$

$$\Delta\psi_3 = \frac{\dot{\psi}_C + \Delta\dot{\Psi}'_1}{K}$$

$$\Delta\psi = \Delta\psi_1 + \Delta\psi_3$$

End if $$\psi_{PREDICTION} = \psi_C + \Delta\psi$$

Of the three implementations set forth above, the exact solution is likely to produce the most accurate heading prediction, but it is the most computationally demanding. The iterative solution is the more exact of the other two less computationally demanding solutions, but it may sometimes have convergence problems. The approximate solution will never have convergence problems, but it is the least exact solution.

The invention provides the pilot with a significantly reduced workload and allows the pilot to focus more attention on other tasks, thereby improving mission effectiveness and increasing safety. A system configured in accordance with one aspect of the invention has been demonstrated in an AH-64A helicopter simulator to achieve the aforementioned turn to target performance specification goals for maneuverability and agility of helicopters established by the U.S. Army.

Other aspects and features of the present invention can be obtained from a study of the drawings, the disclosure, and the appended claims. For example, although the foregoing has focused on piloted rotorcraft, the invention could be used on other aircraft, machines such as robot arms and cranes, that need to be precisely pointed in a desired direction, and in connection with flight controls for remotely piloted vehicles, such as, for example, unmanned helicopters as means for a remote pilot and/or an autonomous flight control system to better control such a vehicle. The invention is applicable to both fixed wing and helicopter aircraft in both "coordinated" and "uncoordinated" pointing (or hybrid) tasks. For instance, at a given speed, the heading rate (analogous to yaw rate for a hovering vehicle) is proportional to the bank angle in a coordinated turn. The heading acceleration is proportional to the bank angle rate. The heading "jerk" is proportional to the bank angle acceleration.

What is claimed is:

1. A computerized system for cueing a pilot of a maneuvering aircraft to a closest possible aircraft attitude where an angular rate of the maneuvering aircraft can be arrested at a final aircraft attitude with essentially no attitude overshoot, the system comprising: a processor, programmed to calculate, during a maneuver, a predicted final aircraft attitude based on aircraft parameters; and a visual cue referenced to an image of the outside world, said visual cue generated by information provided by said processor, corresponding to said predicted final aircraft attitude.

2. The system of claim 1, wherein the image of the outside world is a virtual image.

3. The system of claim 1, wherein the image of the outside world is provided by a synthetic vision system.

4. The system of claim 1, wherein the angular rate includes a yaw rate.

5. The system of claim 1, wherein the visual cue is a diamond shaped cue with cross hairs.

6. The system of claim 1, wherein the visual cue is referenced to and superimposed over head-tracked FLIR imagery.

7. The system of claim 1, wherein the visual cue is provided in a monocle lens.

8. The system of claim 1, wherein the visual cue is adapted to move horizontally and vertically with respect to head-tracked FLIR imagery to simultaneously indicate a closest possible heading where the aircraft angular rate can be stopped with no heading overshoot and a closest possible aircraft pitch attitude where the aircraft pitch rate can be arrested with no pitch attitude overshoot.

9. The system of claim 1, wherein the visual cue uses head-up flight display symbology.

10. The system of claim 1, wherein the visual cue uses head-down flight display symbology.

11. The system of claim 1, wherein the visual cue uses a diamond shaped cue superimposed on a heading tape indicator of a flight display.

12. A system for providing enhanced control authority in a rotorcraft, comprising: a processor, programmed to calculate, during a maneuver, a predicted final rotorcraft attitude based on rotorcraft parameters, said rotorcraft parameters including a maximum angular rate, a maximum angular acceleration, and a maximum angular jerk; and an output device operatively connected to the processor, and capable of conveying said predicted final rotorcraft attitude to a rotorcraft controller.

13. The system of claim 12, wherein the output device includes a visual display of a heading prediction cue.

14. A system for providing enhanced yaw control authority in a rotorcraft, comprising: a processor having a memory, programmed to calculate, during a turning maneuver, a predicted rotorcraft azimuth angle based on rotorcraft turning parameters, said rotorcraft parameters including a maximum yaw rate, a maximum yaw acceleration, and a maximum yaw jerk; an output device operatively connected to the processor, and capable of conveying said predicted rotorcraft azimuth to a rotorcraft controller.

15. The system of claim 14, wherein the output device includes a visual display of a heading prediction cue.

16. A method of providing enhanced control authority in a rotorcraft, the method comprising: calculating, during a maneuver, a predicted final rotorcraft attitude based on rotorcraft parameters, said rotorcraft parameters including a maximum angular rate, a maximum angular acceleration, and a maximum angular jerk; and conveying said predicted final rotorcraft attitude to a rotorcraft controller.

17. The method of claim 16, wherein conveying said predicted final rotorcraft attitude includes providing a visual display of a heading prediction cue.

18. A method of cueing a pilot of a maneuvering aircraft to a closest possible aircraft attitude where an angular rate of the maneuvering aircraft can be arrested at a final aircraft attitude with essentially no attitude overshoot, the method comprising: calculating, during a maneuver, a predicted final aircraft attitude based on aircraft parameters; and providing a visual cue corresponding to said predicted final aircraft attitude.

19. The method of claim 18, wherein said visual cue is referenced to an image of the outside world.

20. The method of claim 18, wherein the angular rate includes a yaw rate.

* * * * *